US008928329B2

(12) United States Patent
Downing et al.

(10) Patent No.: US 8,928,329 B2
(45) Date of Patent: Jan. 6, 2015

(54) COLD CATHODE GAUGE FAST RESPONSE SIGNAL CIRCUIT

(75) Inventors: Bert Downing, Longmont, CO (US); Donghua Gu, Superior, CO (US); Neil T. Peacock, Broomfield, CO (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 13/559,347

(22) Filed: Jul. 26, 2012

(65) Prior Publication Data

US 2013/0249563 A1    Sep. 26, 2013

Related U.S. Application Data

(60) Provisional application No. 61/511,931, filed on Jul. 26, 2011.

(51) Int. Cl.
*G01L 21/30* (2006.01)
*G01L 21/34* (2006.01)

(52) U.S. Cl.
CPC ..................................... *G01L 21/34* (2013.01)
USPC ........... 324/460; 324/459; 324/461; 324/462; 324/463; 324/464; 324/465; 324/466; 324/467; 324/468; 324/469; 324/470

(58) Field of Classification Search
CPC ............................... G01L 21/34; G01L 21/32
USPC .................................................. 324/459–470
See application file for complete search history.

(56) References Cited

U.S. PATENT DOCUMENTS

| 2,497,213 | A | * | 2/1950 | Downing | 324/461 |
|---|---|---|---|---|---|
| 3,227,872 | A | | 1/1966 | Nemeth | |
| 3,321,701 | A | * | 5/1967 | Crowell | 324/460 |
| 3,350,590 | A | * | 10/1967 | Young | 313/7 |
| 3,378,712 | A | * | 4/1968 | Lafferty | 313/7 |
| 4,967,157 | A | | 10/1990 | Peacock | |
| 5,157,333 | A | * | 10/1992 | Peacock et al. | 324/463 |
| 5,198,772 | A | * | 3/1993 | Peacock et al. | 324/463 |
| 5,278,510 | A | * | 1/1994 | Baptist et al. | 324/460 |
| 5,572,118 | A | | 11/1996 | Lewis | |
| 5,801,535 | A | * | 9/1998 | Bills | 324/462 |
| 6,627,874 | B1 | | 9/2003 | Yefchak | |
| 6,642,723 | B2 | * | 11/2003 | Blank | 324/690 |
| 6,756,785 | B2 | * | 6/2004 | Peacock et al. | 324/460 |
| 7,030,619 | B2 | * | 4/2006 | Arnold et al. | 324/460 |

(Continued)

OTHER PUBLICATIONS

International Search Report ; PCT/US2012/48362; Nov. 8, 2012; 7 pgs.

*Primary Examiner* — Patrick Assouad
*Assistant Examiner* — Lamarr Brown
(74) *Attorney, Agent, or Firm* — James R. Young; Cochran Freund & Young LLC

(57) ABSTRACT

A fast response output signal circuit (10) for a cold cathode gauge is provided to produce a fast response output signal (48) in addition to a voltage output signal (40) that is representative of the pressure in the cold cathode gauge. The fast response output signal (48) is either on or off, thus can be used to trigger a closing of an isolation valve or other responsive action upon a change in pressure that attains or exceeds a certain set point threshold. The fast response output signal is produced and processed with analog circuits, but the set point is produced with a microprocessor. The voltage output signal can be produced as a logarithmic function of the pressure.

9 Claims, 11 Drawing Sheets

(56) References Cited

U.S. PATENT DOCUMENTS

| | | | |
|---|---|---|---|
| 7,030,620 B2* | 4/2006 | Correale | 324/460 |
| 7,141,983 B2* | 11/2006 | Liu et al. | 324/460 |
| 8,324,905 B2* | 12/2012 | Barrett | 324/464 |
| 2001/0011890 A1* | 8/2001 | Kawasaki | 324/460 |
| 2002/0101247 A1* | 8/2002 | Whynall et al. | 324/460 |
| 2004/0017202 A1* | 1/2004 | Peacock et al. | 324/460 |
| 2006/0123915 A1* | 6/2006 | Arnold et al. | 73/708 |
| 2009/0015264 A1* | 1/2009 | Knott et al. | 324/460 |
| 2009/0045816 A1 | 2/2009 | Robinson | |
| 2009/0096460 A1* | 4/2009 | Watanabe et al. | 324/462 |
| 2011/0018546 A1* | 1/2011 | Kitano et al. | 324/464 |
| 2011/0133746 A1* | 6/2011 | Shinada et al. | 324/464 |
| 2011/0163754 A1* | 7/2011 | Carmichael et al. | 324/460 |
| 2011/0187379 A1* | 8/2011 | Shinada et al. | 324/464 |
| 2011/0260732 A1* | 10/2011 | Shinada et al. | 324/464 |
| 2011/0315872 A1* | 12/2011 | Nakajima et al. | 250/283 |
| 2011/0316551 A1* | 12/2011 | Shinada et al. | 324/464 |
| 2011/0316552 A1* | 12/2011 | Shinada et al. | 324/464 |

* cited by examiner

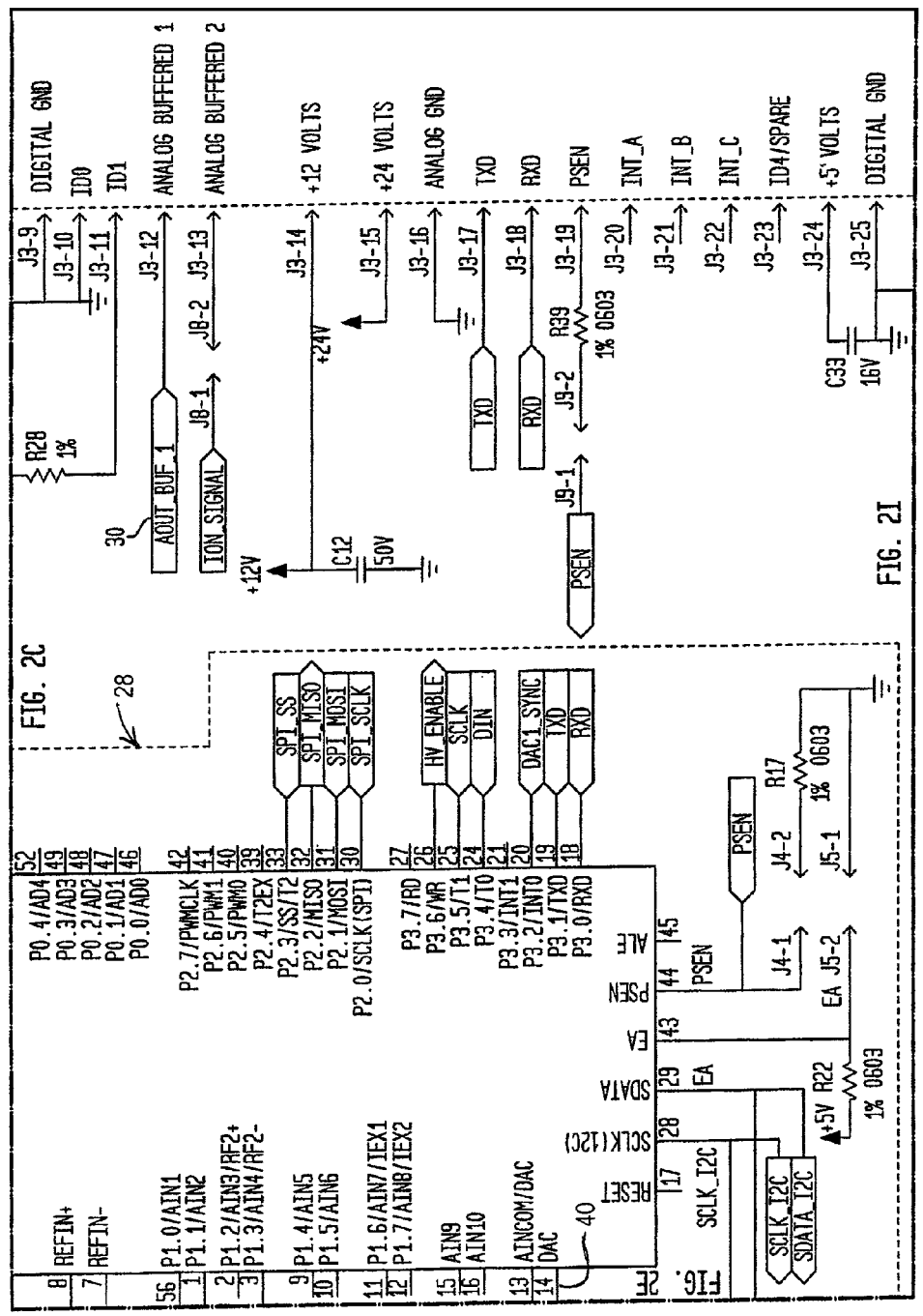

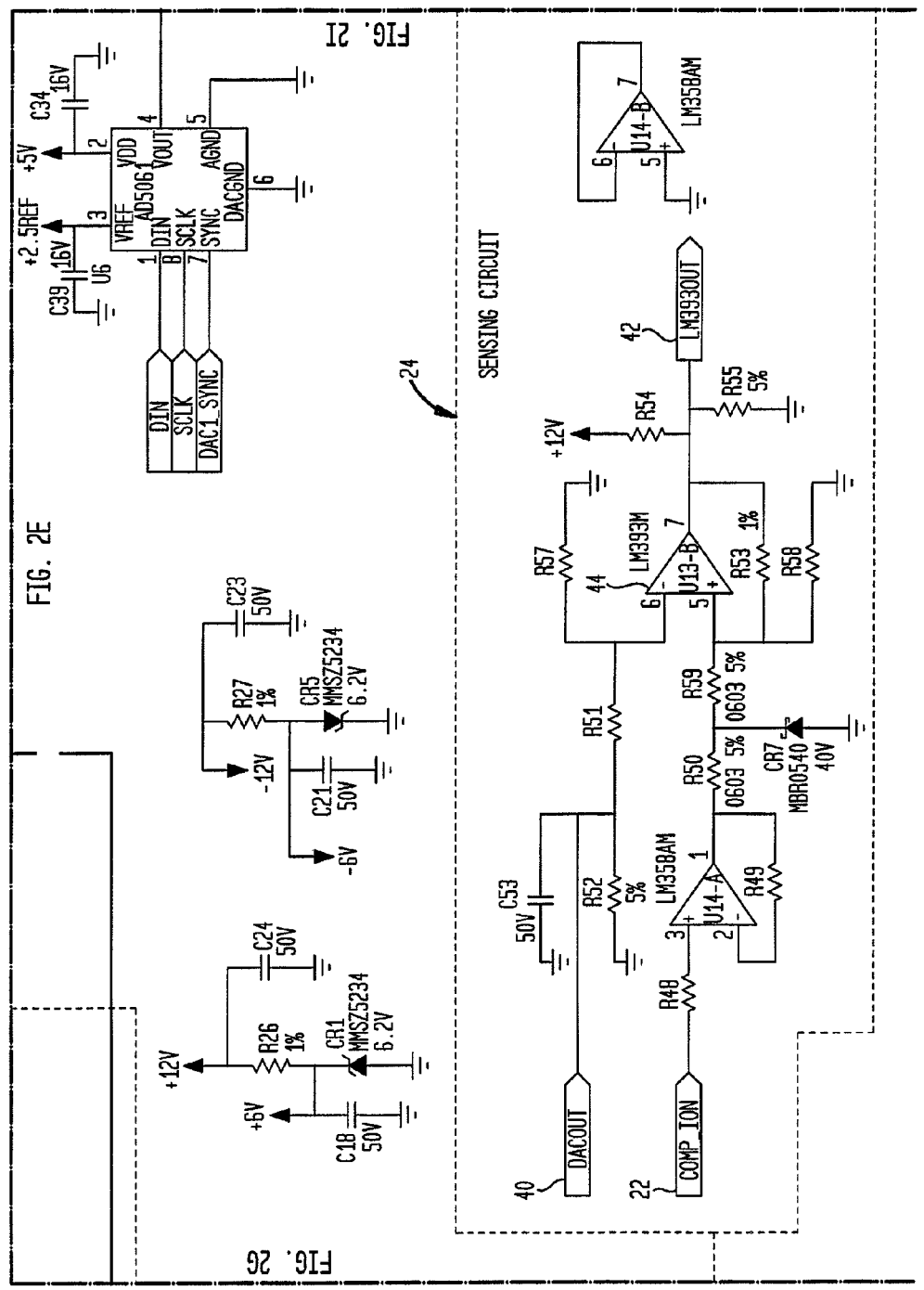

COLD CATHODE GAUGE FAST RESPONSE SIGNAL CIRCUIT

CROSS-REFERENCE TO RELATED APPLICATIONS

This patent application is a non-provisional application of U.S. Provisional Application No. 61/511,931, filed Jul. 26, 2011, which is incorporated herein by reference in its entirety for all that it teaches and describes.

BACKGROUND OF THE INVENTION

1. Technical Field of the Invention

This invention is related to signal processing circuits in general and for cold cathode pressure gauges as a particular example application.

2. State of the Prior Art

Cold cathode gauges are used to measure pressures in ultra-high vacuum (UHV) systems or chambers, i.e., ultra-low pressure ranges. They are accurate and sensitive for pressures ranging from $10^{-2}$ torr down to $10^{-9}$ torr. A variation of a cold cathode gauge, known in the art as an inverted magnetron, can measure down to $10^{-12}$ torr. Therefore, cold cathode gauges are used not only for measuring pressures in such UHV systems or chambers, but signal outputs from cold cathode gauges are useful for myriad process and control applications in which ultra-high vacuums are used.

In typical cold cathode gauges, electrons produced in the discharge of a high voltage travel through the gauge and ionize gas molecules around them. The resulting ions are collected at a negative electrode, and the current depends on the number of ions, which depends on the pressure in the gauge. Consequently, the ion current in a cold cathode gauge is proportional to the pressure in the gauge and can be used as an output signal that is indicative of pressure. For example, for pressures in a range of $10^{-3}$ to $10^{-8}$ torr the relationship between the ion current and pressure is $i=kP^n$, where i is the ion current, k is a constant related to the particular gas or gases in the system or chamber and other characteristics of the particular cold cathode gauge, P is the pressure, and n is a constant.

The foregoing examples of related art and limitations related therewith are intended to be illustrative, but not exclusive or exhaustive, of the subject matter. Other aspects and limitations of the related art will become apparent to those skilled in the art upon a reading of the specification and a study of the drawings.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting.

In the drawings:

FIG. 2F is a schematic diagram of one portion of an example fast-action circuit comprising FIGS. 2A-2I that is capable of producing an output control signal in response to a sensed change in pressure (the borders of this portion are marked with the figure numbers of adjacent portions for continuity);

FIG. 2H is a schematic diagram of one portion of an example fast-action circuit comprising FIGS. 2A-2I that is capable of producing an output control signal in response to a sensed change in pressure (the borders of this portion are marked with the figure numbers of adjacent portions for continuity);

DETAILED DESCRIPTION OF EXAMPLE EMBODIMENT

Figure 1:
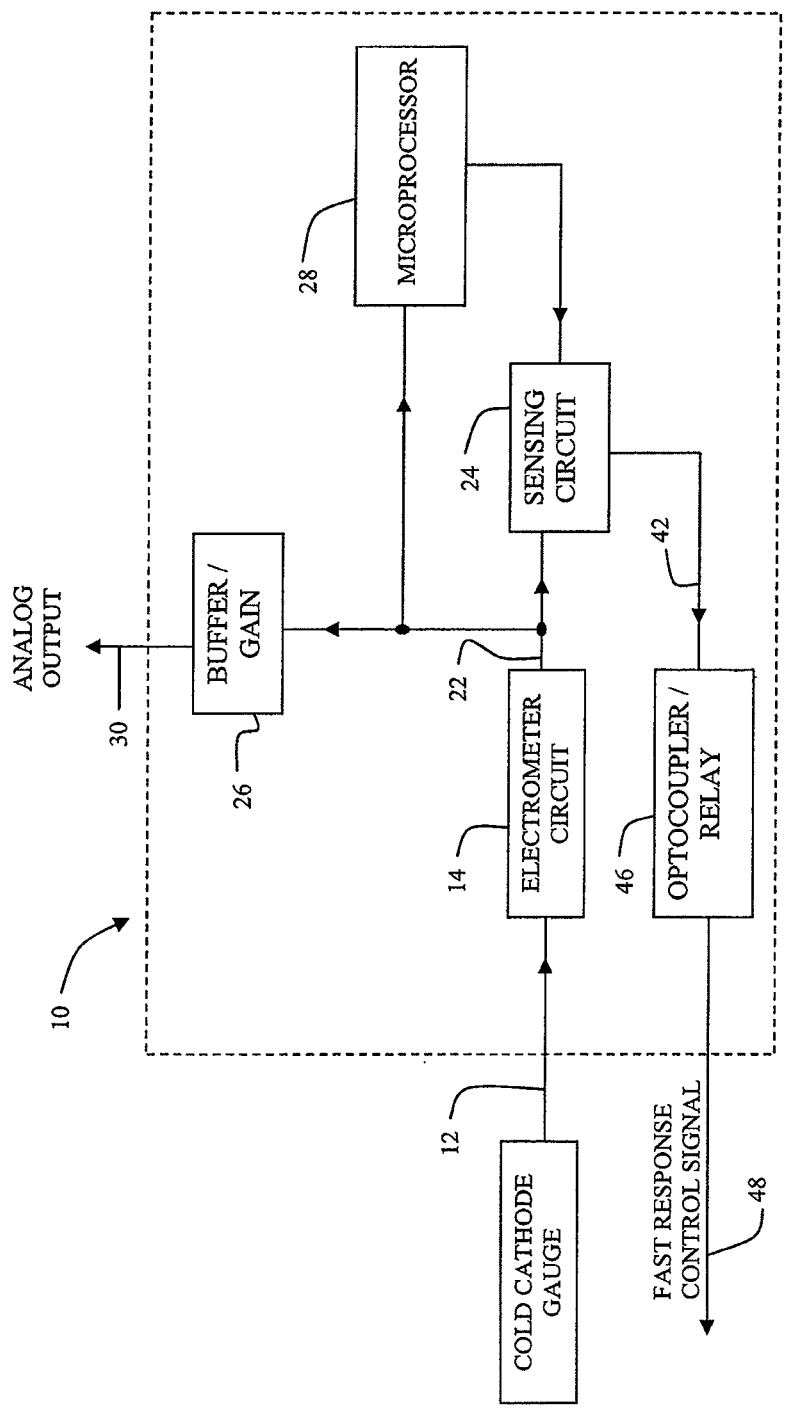
FIG. 1 is a function block diagram of an example fast-action circuit for producing an output control signal in response to a sensed change in pressure by a cold cathode pressure sensor.

An example fast response signal circuit 10 illustrated in the function block diagram of FIG. 1 and the schematic circuit diagram of FIGS. 2A-2I is provided for use in applications wherein a control signal from a cold cathode gauge is desired in a very fast time response to a pressure change or a pressure exceeding a pressure set point. For example, in many ultra-high vacuum (UHV) systems, a sudden leak can be a disaster as it will not only destroy some expensive device that can only operate under high vacuum (such as beam/ion source), but may also require an excessively long time (e.g., days) to pump down the system, so fast closing of an isolation valve or other remedial action is important to mitigating adverse effects of such malfunctions.

In one example application for such a fast control response signal, the particle beam outputs of a synchrotron operate at ultra-high vacuums and are used to provide particle beams for many applications, for example, in atomic research, crystallography, drug discovery and research, semiconductor materials and analysis, chemical analysis, medical imaging, and numerous others. In such synchrotron equipment, the storage ring and booster ring must kept under high vacuum all the time, while beam lines or pipes may be opened frequently for performing experiments, and loading samples. In the event the pressure in a beam line increases abnormally during operation (for example, due to rapid outgassing from the sample or a leak in the beam line), such pressure rises could adversely affect the storage ring. Therefore, in such an event, a fast isolation valve, for example, a gate valve must be closed very rapidly to protect the storage ring. As an example, if the pressure in the beam line of a synchrotron is higher than $1\ e^{-5}$ torr, the main isolation valve should be closed. The length and diameter of the beam line depends on the particular synchrotron equipment, but, as an example, the length of the beam line could be about ten meters. If the beam line end is opened suddenly, a pressure wave will travel at local sonic speed in the beam line to the storage ring (e.g., about 340 msec at room temperature), so the pressure wave will reach the junction within about 30 milliseconds (msec).

Therefore, to protect the storage ring, the entire pressure monitoring and protection system (e.g., the cold cathode gauge, the signal processing circuit that monitors the cold cathode gauge output signal and generates a control signal, and the isolation valve, must all respond very quickly in order to ensure that the isolation valve is fully closed within such example 30 msec. These functions include the time for the pressure sensor (e.g., cold cathode gauge) to respond to the change in pressure in the beam line, the time for the controller to detect the signal output change from the cold cathode gauge and to output a control signal to activate the fast relay, the time for activation of the pilot solenoid valve of a pneumatic isolation valve, and the time required for the isolation valve to close completely.

The example fast response circuit 10 illustrated in FIGS. 1 and 2A-2I was developed for cold cathode gauge applications, because the signal from the cold cathode gauge is a current generated by the ionization of the gas or gasses in the atmosphere surrounding the high voltage cathode and is proportional to the pressure in the gauge and dependent on the gas being measured. Either a cold cathode gauge or a hot cathode gauge can be used to measure pressures accurately at the UHV pressure ranges for the applications for which this example fast response signal circuit was developed, e.g., a range of about $10^{-10}$ to $10^{-3}$ torr. However, since the output signals from the electrometer component of typical hot cathode gauges are voltages that are not proportional to the measured pressure, additional signal processing would be required, thus requiring more processing time to produce the output control signal, which would be counterproductive to the fast action response that is a goal of the example circuit 10 illustrated in FIGS. 1 and 2A-2I. For example, to extend the filament life in hot cathode gauges, lower emission current is often used at higher pressures, e.g., for pressures greater than $1\ e^{-4}$ torr, which results in the potential of identical voltage output signals at two different pressures, and further signal processing would be required to produce a correct and reliable control signal, thereby increasing the time it takes to generate the control signal output. In contrast, the current output signal of cold cathode gauges is proportional to the pressure in the pressure ranges of interest, as explained above, thus more conducive to fast response signal processing to output the control signal.

Figure 2A:
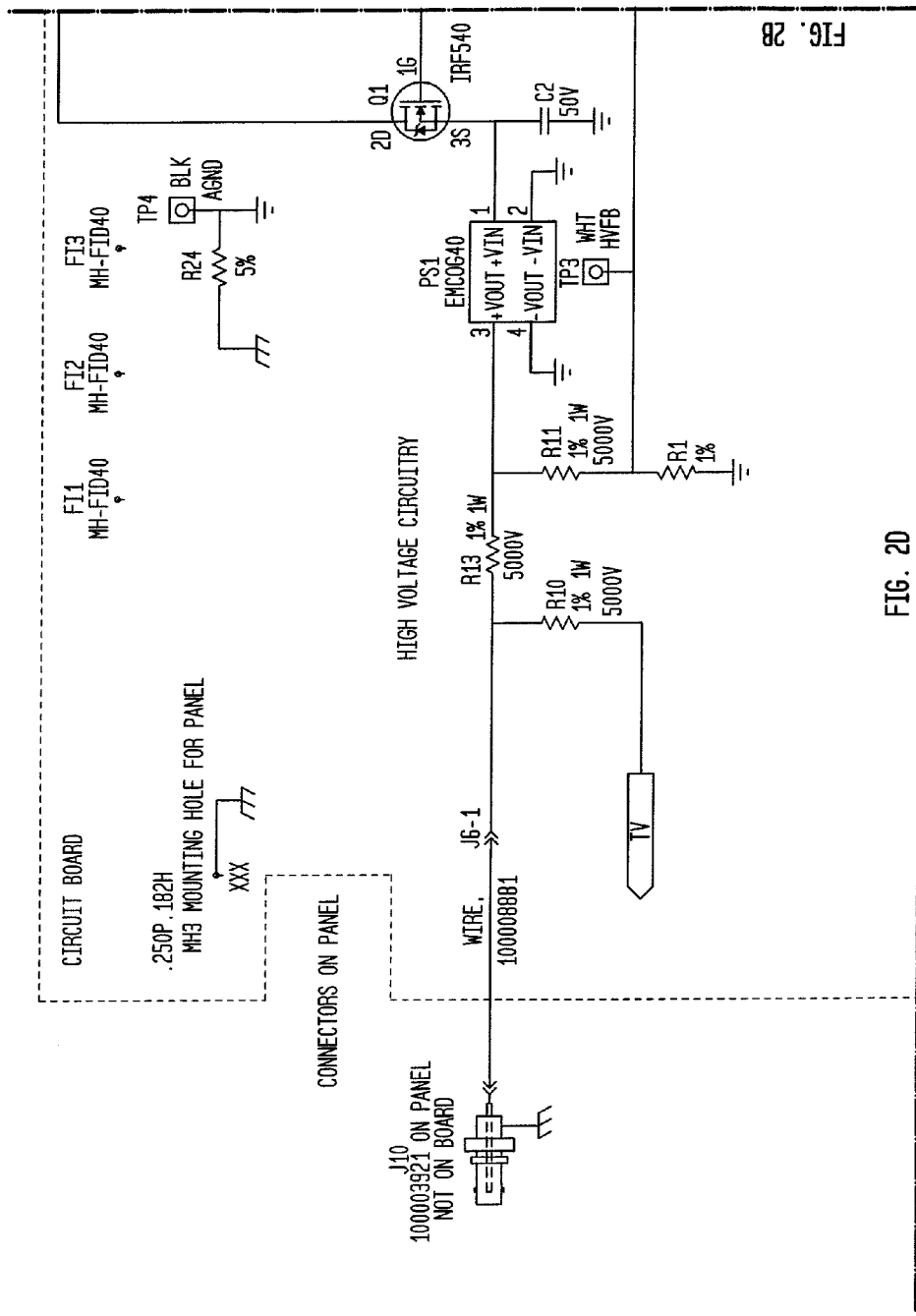
FIG. 2A is a schematic diagram of one portion of an example fast-action circuit comprising FIGS. 2A-2I that is capable of producing an output control signal in response to a sensed change in pressure (the borders of this portion are marked with the figure numbers of adjacent portions for continuity)
Figure 2B:
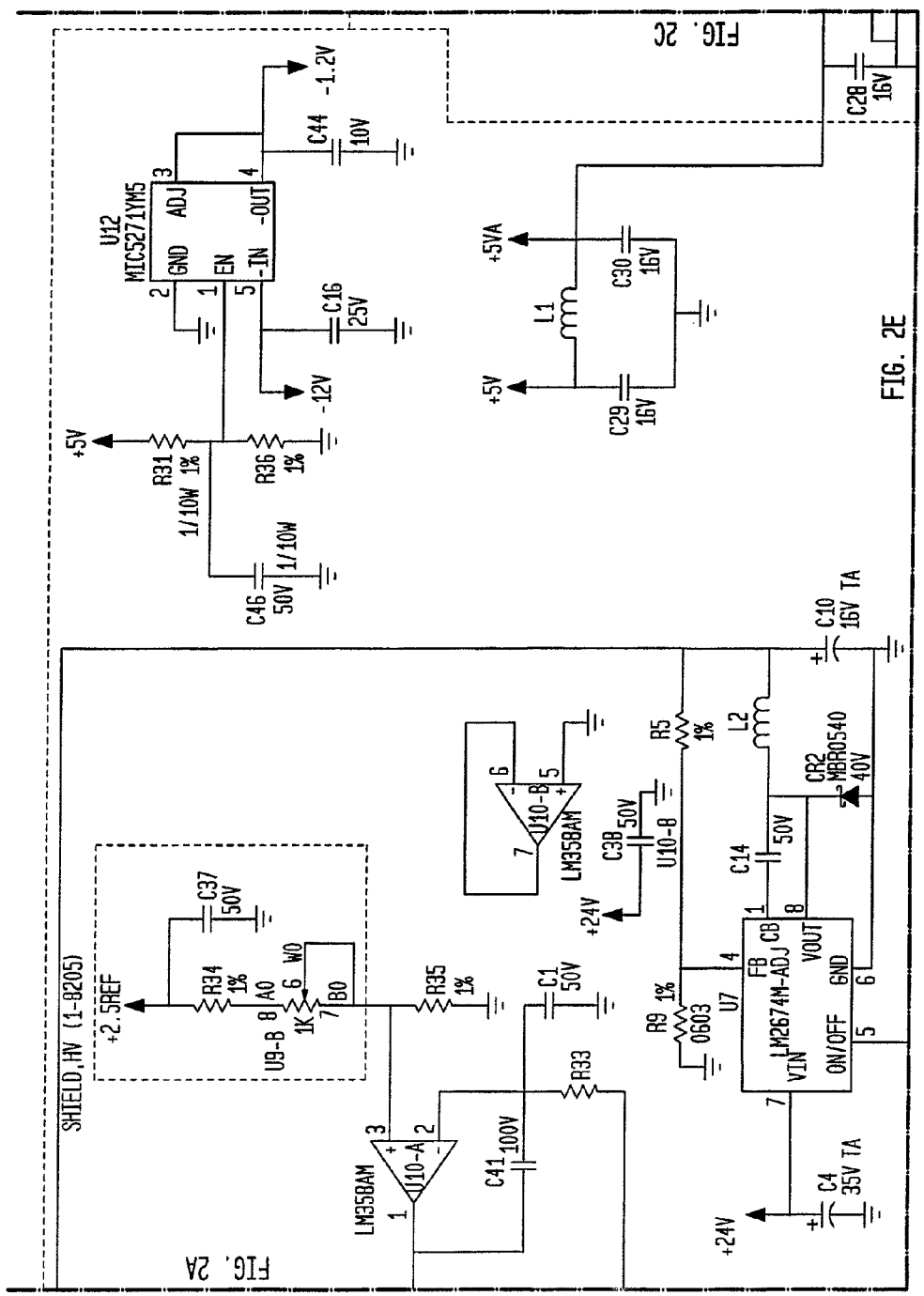
FIG. 2B is a schematic diagram of one portion of an example fast-action circuit comprising FIGS. 2A-2I that is capable of producing an output control signal in response to a sensed change in pressure (the borders of this portion are marked with the figure numbers of adjacent portions for continuity)
Figure 2C:
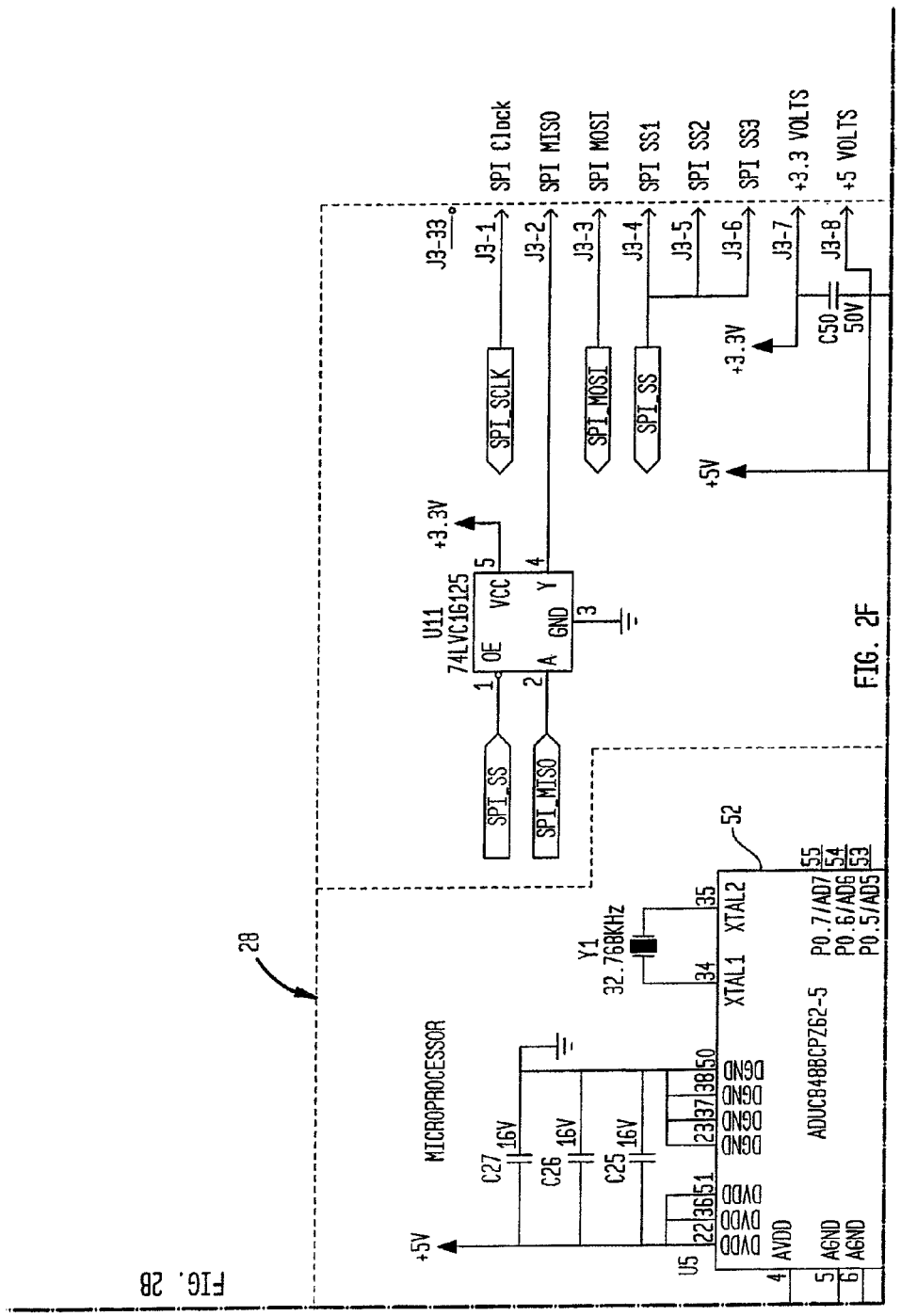
FIG. 2C is a schematic diagram of one portion of an example fast-action circuit comprising FIGS. 2A-2I that is capable of producing an output control signal in response to a sensed change in pressure (the borders of this portion are marked with the figure numbers of adjacent portions for continuity)
Figure 2D:
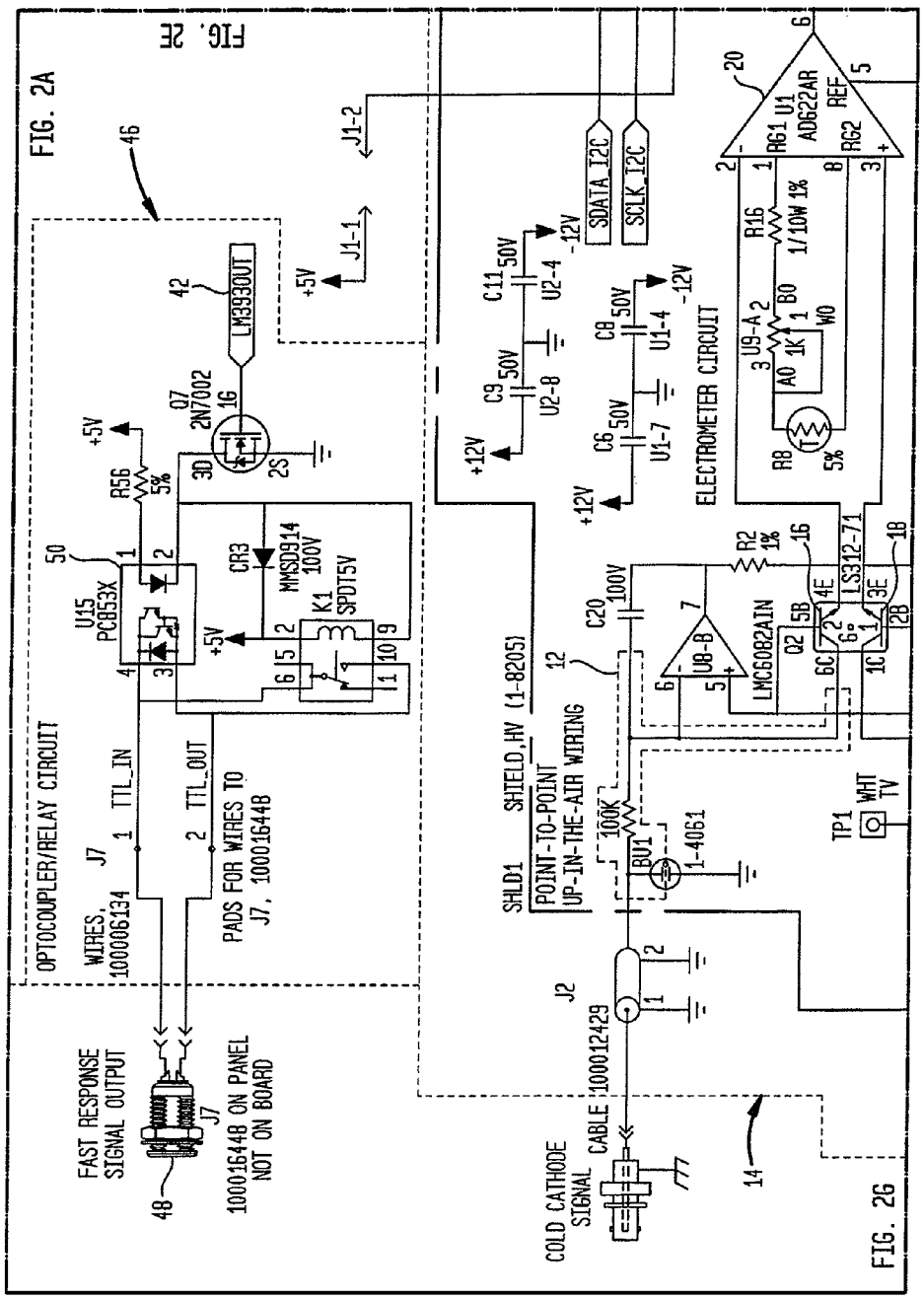
FIG. 2D is a schematic diagram of one portion of an example fast-action circuit comprising FIGS. 2A-2I that is capable of producing an output control signal in response to a sensed change in pressure (the borders of this portion are marked with the figure numbers of adjacent portions for continuity)

In the example fast response circuit 10 illustrated in FIGS. 1 and 2A-2I, the current signal output 12 of a cold cathode gauge is the input for the electrometer circuit 14 of the fast response circuit 10, which comprises a logarithmic amplifier that is used to convert the linear ionization current signal 12 into a logarithmic voltage that is indicative of the pressure measured by the cold cathode gauge. As best seen in FIGS. 2A-2I, the logarithmic amplifier is constructed by measuring the base-emitter voltage of a bipolar first transistor 16 (FIG. 2D) when the ionization current 12 (FIGS. 1 and 2D) is flowing through the collector of the first transistor 16. This base emitter voltage is compared to the base emitter voltage of a matched second transistor 18 (FIG. 2D), for example, by a difference amplifier 20 (FIG. 2D). By taking the difference of the two base-emitter voltages and multiplying them by their temperature coefficient, a stable, first analog voltage output signal 22 (FIGS. 1 and 2E) is generated that is a logarithmic function and proportional to the input current 12. Therefore, the first analog voltage output signal 22 of the electrometer circuit 14 is a logarithmic voltage proportional to the input cold cathode gauge current 12. This first analog voltage output signal 22 feeds the sensing circuit 24 (FIGS. 1 and 2H), the buffer/gain stage 26 (FIGS. 1 and 2E), and the microprocessor circuit 28 (FIGS. 1, 2C, and 2F).

A logarithmic amplifier is used in this example circuit 10 because of the wide range on input current 12 from the cold cathode gauge and the limited voltage range of the microprocessor circuit 28 used to convert the voltage of the signal 22 to a system pressure. However, other circuit designs and components (not shown) can be developed and provided for a non-logarithmic scale by persons skilled in the art, once they understand the principles of this invention.

The buffer/gain stage or circuit 26 is used to isolate the first analog voltage output signal 22 produced by the electrometer circuit 14 from a second analog output signal 30 (FIGS. 1 and 2E) that is a direct representation of the system pressure, which can be used for any pressure measuring, monitoring, control, or other purpose desired by a user, so that the input first analog voltage output signal 22 is not affected by a user's external equipment (not shown) that may be connected to the second analog output signal 30. The input to the buffer/gain stage 26 is the first analog voltage output signal 22 of the electrometer circuit 14, as is the input 22 to the microprocessor circuit 28. By providing the buffer 26, the circuit 10 provides a low impedance source for the second analog output signal 30 that minimizes output voltage deviation under a wide variety of user input impedances that may be connected to the second analog output signal 30. The buffer 26 is created by using an operational amplifier 32 that has a gain (e.g., a gain=1.4). The graph in FIG. 3 shows an example relationship between the second analog output signal 30 voltage from the buffer/gain circuit 26 and the actual pressure that is measured by the cold cathode gauge.

The function of the sensing circuit 24 is to compare the electrometer output, e.g., the first analog voltage output signal 2Z to a set point 40 (see FIG. 2H) configured by a user or which can be pre-set at the factory. The sensing circuit 24 then generates a state signal 42 that changes state (e.g., off to on, high to low, or other state variation) within a very short time, e.g., 3 milliseconds (ms), of a pressure measurement signal 12 from the cold cathode gauge that meets or exceeds the set point 40 configured as explained above. The sensing circuit 24 comprises a comparator 44 that compares the analog voltage of the first analog voltage output signal 22 from the electrometer circuit 14 to a digital to analog converter (DAC) output set point voltage 40 set by the user (see DACOUT 40 of the microprocessor circuit 28 in FIGS. 2E and 2F). When the first analog voltage output signal 22 from the electrometer circuit 14 is higher than the DAC output set point voltage 40, the comparator 44 outputs a state signal voltage 42 that triggers the optoisolator or relay (optocoupler relay) 46 (FIG. 2D) to produce a fast response control signal 48 (FIGS. 1 and 2D), which can be used for any desired purpose, for example, to activate one or more external isolation valve(s) (not shown). The optoisolator (optocoupler relay) relay circuit 46 shown in FIG. 2D of the example fast response circuit 10 comprises a solid state relay 50 with optical coupling, although an electromechanical or other conventional relay could also be used. The optoisolator (optocoupler relay) relay circuit 46 provides galvanic isolation from the external equipment to which the fast response output signal 48 is connected, if that function is desired. Additionally, the optoisolator (optocoupler relay) relay circuit 46 can provide the fast response control signal 48 in any desired voltage, which in this example, can be up to as much as 175 V. Other voltage ranges can also be provided by persons skilled in the art once they understand the principles of this invention.

Figure 2E:
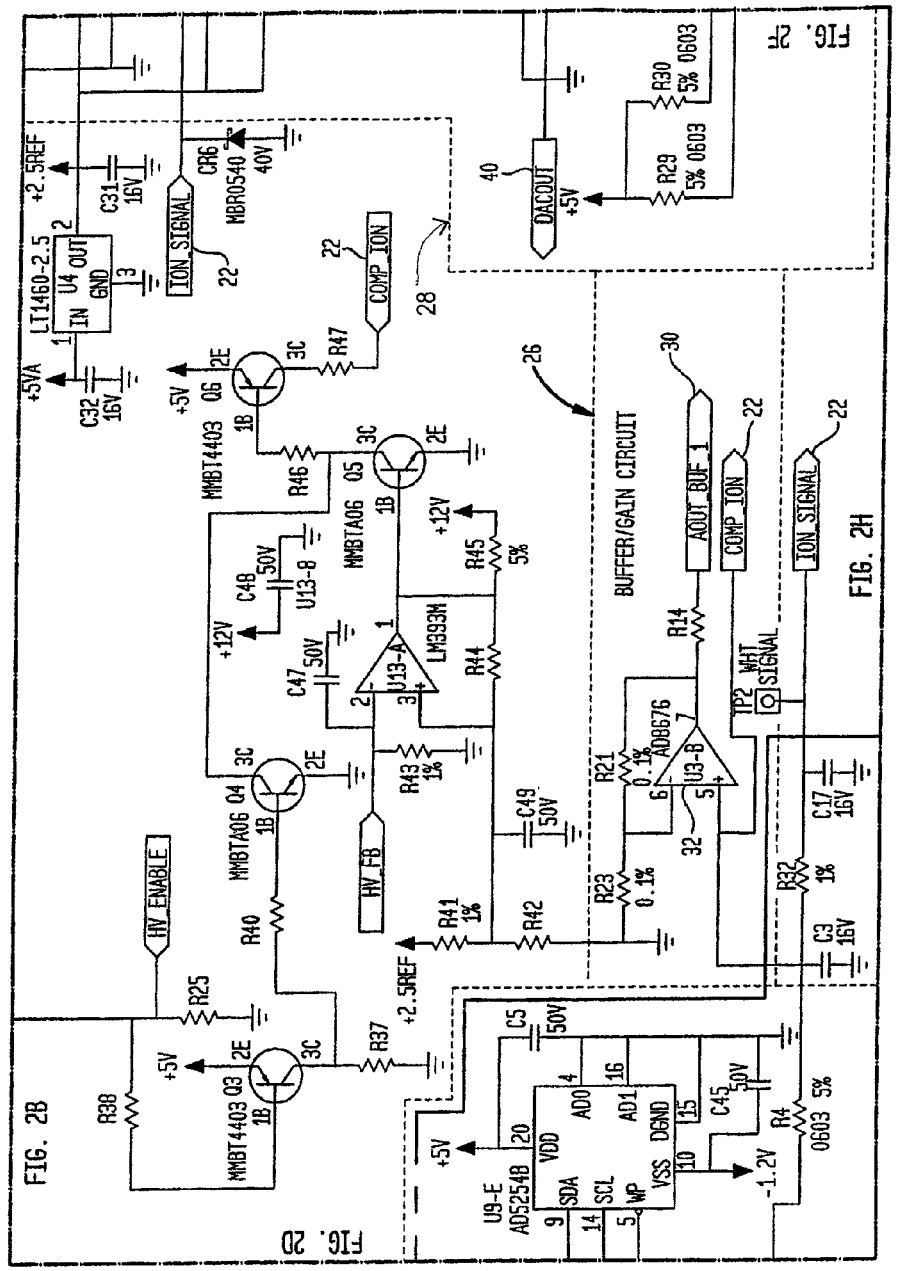
FIG. 2E is a schematic diagram of one portion of an example fast-action circuit comprising FIGS. 2A-2I that is capable of producing an output control signal in response to a sensed change in pressure (the borders of this portion are marked with the figure numbers of adjacent portions for continuity)
Figure 2G:
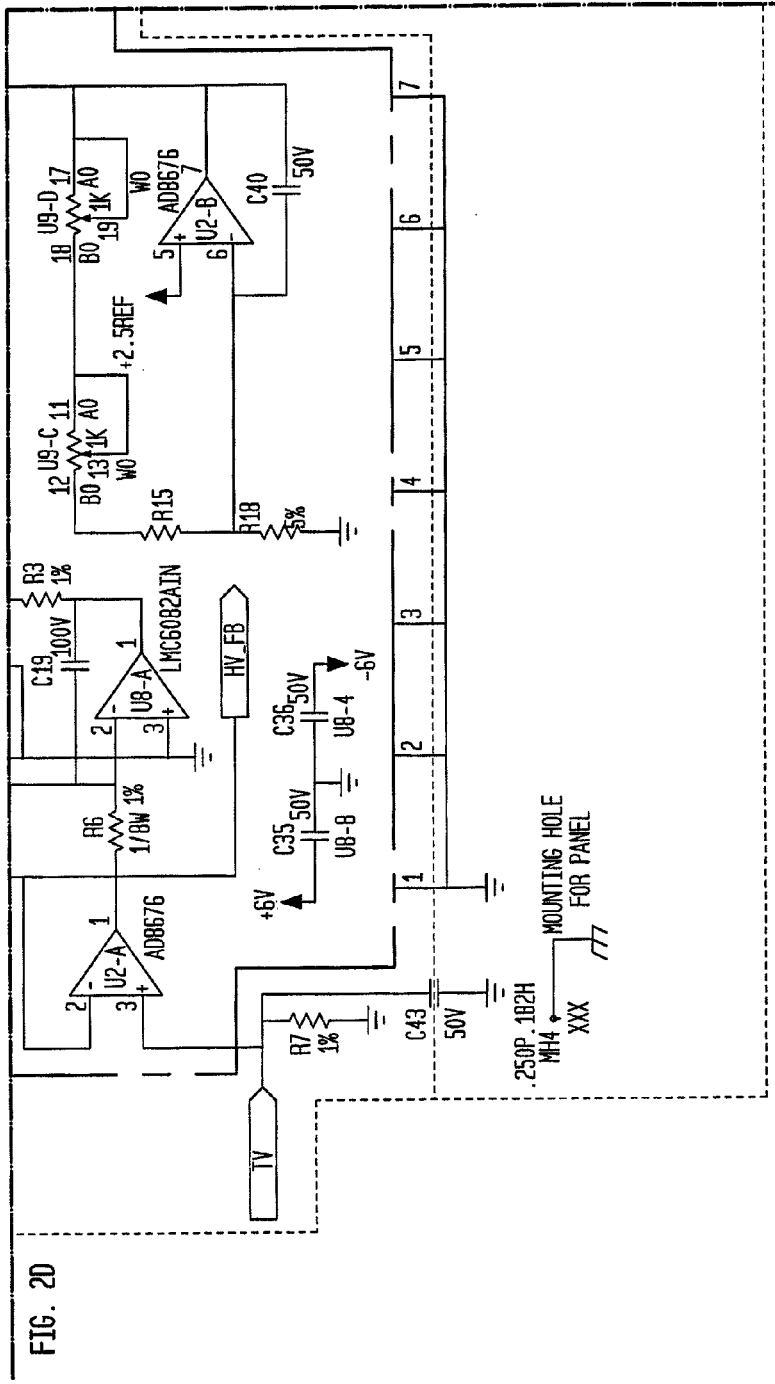
FIG. 2G is a schematic diagram of one portion of an example fast-action circuit comprising FIGS. 2A-2I that is capable of producing an output control signal in response to a sensed change in pressure (the borders of this portion are marked with the figure numbers of adjacent portions for continuity)
Figure 2I:
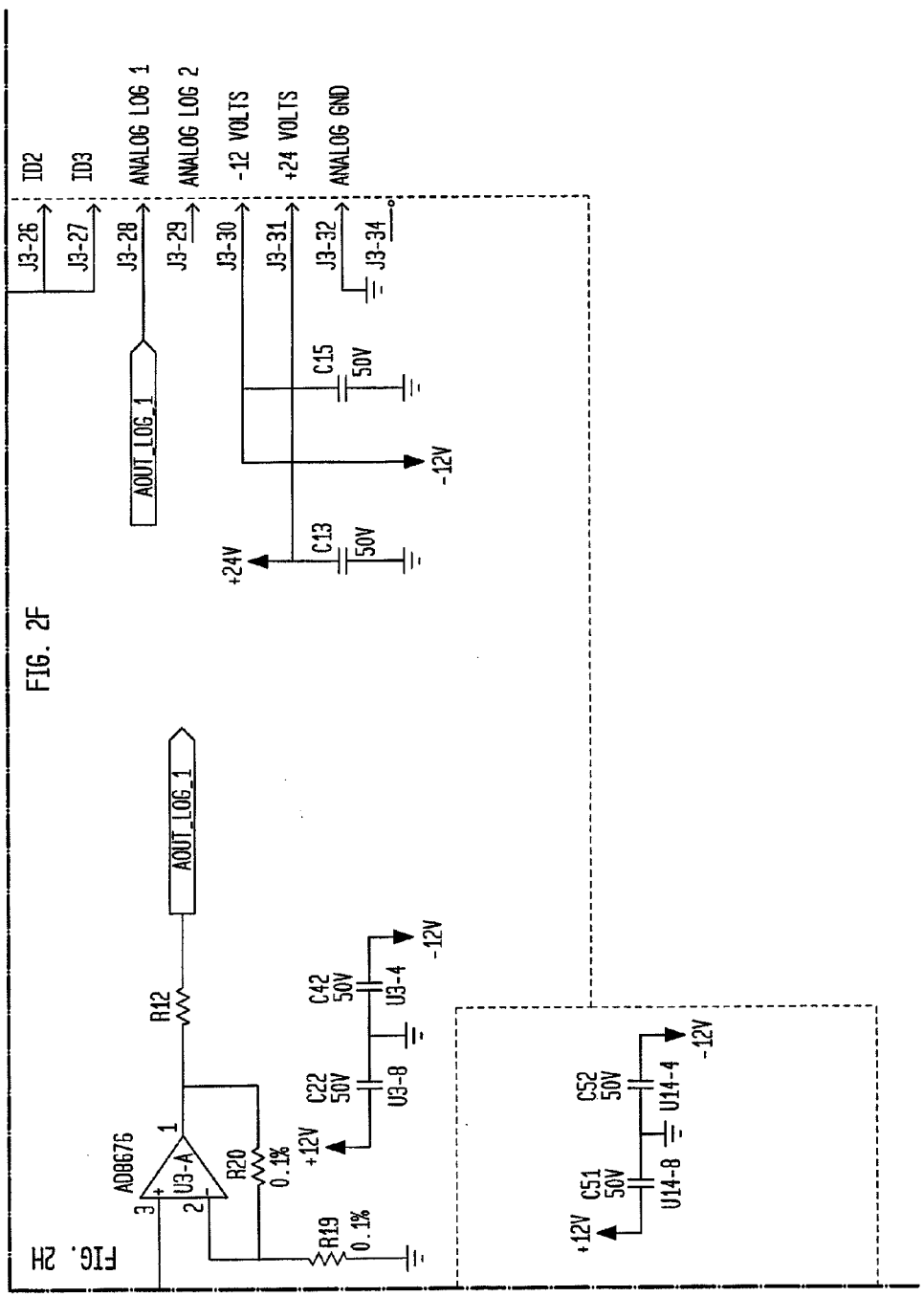
FIG. 2I is a schematic diagram of one portion of an example fast-action circuit comprising FIGS. 2A-2I that is capable of producing an output control signal in response to a sensed change in pressure (the borders of this portion are marked with the figure numbers of adjacent portions for continuity)
Figure 3:
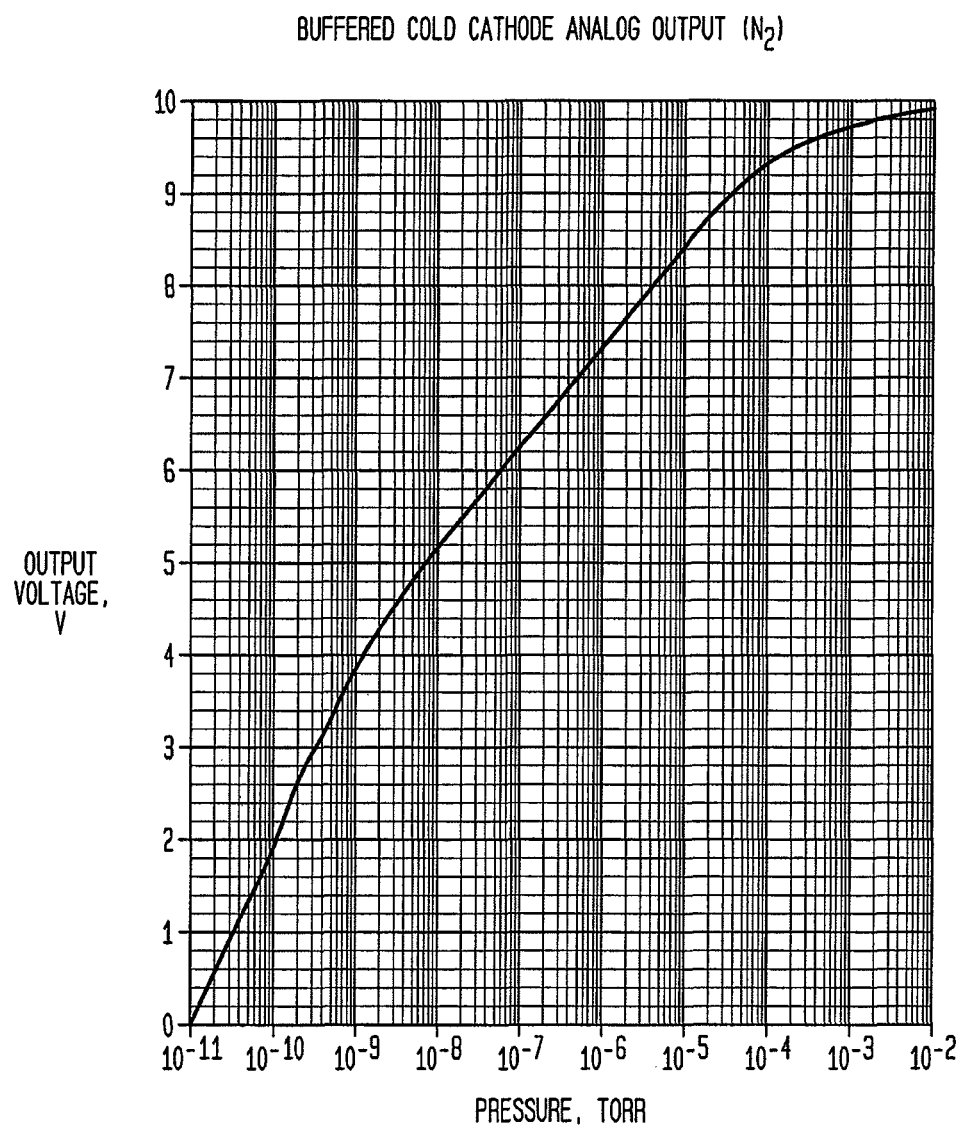
FIG. 3 is a graphical representation of an example analog output voltage versus pressure relationship of an ultra-high vacuum containing nitrogen gas.

For purposes of speed, the only function of the microprocessor circuit 28 for the fast response signal 48 in this example fast response signal circuit 10 is to generate the set point voltage 40, which is provided through a digital to analog converter (DAC) function in the microprocessor chip 52 in the microprocessor circuit 28 (see FIGS. 2E and 2F). This set point voltage 40 is generated by the microprocessor circuit 28 based on a user-defined pressure point or threshold that is input from the cold cathode gauge setup menu. The microprocessor circuit 28 calculates the correct voltage for a given pressure that was input in the menu and then outputs the set point voltage signal 40 for that pressure. The relationships or equations used to generate this voltage are defined during calibration of the board, which can be done empirically, when a known current 12 is input to the electrometer circuit 14. For example, the circuit's gain and offset can be calculated by measuring the voltage of the first analog voltage output signal 22 from the electrometer circuit 14 at two known currents 12. The empirical determination can also take into account the gas type, since the ionization current 12 from the cold cathode gauge differs for different gases, as is understood by persons skilled in the art. The microprocessor circuit 28 involvement in the fast response signal is kept to a minimum in this example fast response signal circuit 10 in order to provide the fastest possible signal state change when a pressure measured by the cold cathode is determined to be equal to or above the set point pressure. For example, after the microprocessor circuit 28 calculates and outputs the appropriate set point voltage signal, the microprocessor circuit 28 is not involved in the comparison of the of the first analog voltage output signal 22 from the electrometer circuit (i.e., the actual pressure signal) to the set point signal or with the generation of the fast response control signal 48. Instead, that comparison function and generation of the state signal voltage 42, which triggers the relay circuit 46 to output the fast response control signal 48, is performed by the sensing circuit 24 in an analog manner without any digital logic or further involvement from the microprocessor circuit 28.

It may be noted that the input 22 to the microprocessor circuit 28 is the first analog voltage output signal 22 of the electrometer circuit 28, which is proportional to the current output 12 of the cold cathode gauge, thus to the pressure in the cold cathode gauge. Therefore, the microprocessor circuit 28 also converts the first analog voltage output signal 22 to pressure values according to the calibration curve for the cold cathode gauge. The curve of the graph in FIG. 3 may be considered such a curve. In this regard, it should be mentioned that this function of the microprocessor circuit 28 in converting and outputting pressure values from the first analog voltage output signal 22 has nothing to do with the analog comparison of the first analog voltage output signal 22 to the set point voltage 40 in the sensing circuit 24 or with the production of the state signal voltage 42. Therefore, as explained above, except for making the user inputs into the set point voltage 40, the microprocessor circuit 28 does not play a role in the production of the fast response control signal 48.

In summary, the fast response signal circuit 10 is designed to allow users to trigger external equipment quickly when a measured pressure exceeds a user configurable set point. In large Ultra-High Vacuum (UHV) systems, users can have costly equipment damaged or undesirable downtime if their vacuum system develops a leak. The fast response signal circuit 10 can provide users with an output signal 48 that can change states within a very short time, e.g., 3 ms, of a pressure change that causes the pressure to be above a user set point. This output signal 48 can be used for myriad purposes, for example, to control external valves to isolate compartments, leaks, or other conditions from other parts of a pressure system to prevent damage or just to preserve pressures or other uses.

The cold cathode and signal processing circuit 10 is designed to measure vacuum system pressure by measuring the ionization discharge current 12 of a high voltage (e.g., 4 kV) cathode. The electrometer circuit 14 comprises a logarithmic amplifier and instrumentation amplifier that is used to convert the cold cathode gauge's ionization current 12 to a log scaled voltage that is proportional to the pressure measured by the cold cathode gauge. This log scaled analog voltage is used as an input to the microprocessor circuit 28 to determine the system's pressure. Additionally, this analog voltage is provided to the fast response signal circuit, located on the cold cathode board, as a trigger for the fast response signal.

The fast response signal circuit 10 in this example comprises a comparator 44 that looks at the electrometer's analog voltage 22 and compares it to a digital to analog converter's (DAC) voltage 40 set by the user. When the voltage 22 from the electrometer circuit 14 is higher than the DAC's voltage 40, the comparator 44 outputs a state signal voltage 42 that triggers the optoisolator or optocoupler relay 46 output to conduct/close in order to activate external equipment or functions, e.g., an isolation valve (not shown) in the example described above. The optoisolator (optocoupler/relay) 46 provides galvanic isolation from the user's equipment if that function is desired. Additionally, it provides the user with the ability to output a voltage of his/her choosing, for example, up to 175V or more.

To prevent the fast response signal output 48 of the optoisolator/relay 46 from chattering, hysteresis is added to the circuit by adding a feedback resistor to the non-inverting input of the comparator 44 that changes the set point once the output has already been triggered. Hysteresis is set by this feedback resistor to be, for example, 15% lower than the original user set point.

The DAC set point voltage 40 is set via a front panel display (not shown) in the cold cathode gauge's submenu. The user can input the desired trigger or threshold set point pressure in the menu, and the microprocessor circuit 28 converts the pressure into a voltage. That is, when a set point pressure is entered into the microprocessor circuit 28, the microprocessor 52 will translate the set point pressure into an equivalent voltage based on the calibration curve of the gauge. A conversion equation or relationship can be developed empirically during calibration of the circuit 10 when a known current 12 is input to the electrometer circuit 14, as would be understood by persons skilled in the art, once the principles of this invention are understood. For example, the circuit's gain and offset can be calculated by measuring the voltage 22 from the electrometer circuit 14 at two known currents 12 for a particular gas being measured.

The foregoing description provides examples that illustrate the principles of the invention, which is defined by the claims that follow. Since numerous insignificant modifications and changes will readily occur to those skilled in the art once they understand the invention, it is not desired to limit the invention to the exact example constructions and processes shown and described above. Accordingly, resort may be made to all suitable combinations, subcombinations, modifications, and equivalents that fall within the scope of the invention as defined by the claims. The words "comprise," "comprises," "comprising," "composed," "composes," "composing," "include," "including," and "includes" when used in this specification, including the claims, are intended to specify the presence of stated features, integers, components, or steps, but they do not preclude the presence or addition of one or more other features, integers, components, steps, or groups thereof.

The invention claimed is:

1. A fast response signal circuit for a cold cathode pressure gauge that provides a current signal which is proportional to pressure in the cold cathode gauge, comprising:
    an electrometer circuit that is connectable electrically to the current signal from the cold cathode pressure gauge and that amplifies and processes the current signal from the cold cathode pressure gauge to provide a first analog voltage output signal that is proportional to the current signal;
    a microprocessor circuit that is programmed to provide a set point voltage signal that is indicative of a set point pressure threshold;
    an analog sensing circuit that is connected electrically to the electrometer circuit and to the microprocessor circuit and that compares the first analog voltage output signal from the electrometer circuit with the set point voltage signal and produces a state signal voltage when the first analog voltage output signal from the electrometer circuit equals or exceeds the set point voltage signal;
    a relay circuit connected electrically to the sensing circuit and that outputs a fast response signal output in response to the state signal voltage produced by the sensing circuit; and
    a buffer/gain circuit connected electrically to the electrometer circuit and that produces a second analog output signal which is indicative of the pressure in the cold cathode gauge.

2. The fast response signal circuit of claim 1, wherein the electrometer circuit includes a logarithmic amplifier and the first analog voltage output signal provided by the electrometer circuit is a logarithmic function of the current signal from the cold cathode pressure gauge.

3. The fast response signal circuit of claim 2, wherein the logarithmic amplifier includes a difference amplifier that produces the first analog voltage output signal as a function of a difference between a base-emitter voltage of a first transistor through which the current signal from the cold cathode gauge flows and a base-emitter voltage of a matched second transistor.

4. A method of providing a fast response control signal from a cold cathode gauge that outputs a current signal which is proportional to pressure in the cold cathode gauge in addition to providing a second analog output signal that is indicative of pressure measured by the cold cathode gauge, comprising:
    amplifying the current signal from the cold cathode gauge and producing a first analog voltage output signal that is proportional to the pressure in the cold cathode gauge;
    feeding the first analog voltage output signal to a buffer/gain circuit, a microprocessor circuit, and an analog sensing circuit;
    amplifying and isolating the first analog voltage output signal with the buffer/gain circuit to produce the second analog output signal that is a direct representation of the pressure in the cold cathode gauge for application by a user to measure, monitor, and/or other purposes;
    providing a set point voltage signal with the microprocessor that is indicative of a threshold pressure at which the fast response control signal is desired;
    comparing the first analog voltage output signal to the set point voltage signal with the analog sensing circuit and producing a state signal voltage with the analog sensing circuit when the first analog voltage output signal equals or exceeds the set point voltage signal; and
    triggering a relay circuit with the state signal voltage to produce the fast response control signal.

5. The method of claim 4, including comparing the first analog voltage output signal with the set point signal-voltage signal and producing the state signal voltage using an analog comparator circuit in the analog sensing circuit.

6. The method of claim 4, including amplifying the current signal from the cold cathode gauge with an logarithmic amplifier and producing the first analog voltage output signal as a logarithmic function of the pressure in the cold cathode gauge.

7. Apparatus for providing a fast response control signal from a cold cathode gauge that outputs a current signal which is proportional to pressure in the cold cathode gauge in addition to providing a second analog output signal that is indicative of pressure measured by the cold cathode gauge, comprising:
    means for amplifying the current signal from the cold cathode gauge and producing a first analog voltage output signal that is proportional to the pressure in the cold cathode gauge;
    means for amplifying and isolating the first analog voltage output signal to produce the second analog output signal that is a direct representation of the pressure in the cold cathode for application by a user to measure, monitor, and/or other purposes;
    means for providing a set point voltage signal that is indicative of a threshold pressure at which the fast response control signal is desired;
    means for comparing the first analog voltage output signal with the set point voltage signal and for producing a state signal voltage when the first analog voltage output signal equals or exceeds the set point voltage signal; and
    means for producing the fast response control signal in response to the state signal voltage.

8. The apparatus of claim 7, including analog means for comparing the first analog voltage output signal with the set point voltage signal and for producing the state signal voltage.

9. The apparatus of claim 7, including logarithmic amplifier means for amplifying the current signal from the cold cathode gauge and producing the first analog voltage output signal as a logarithmic function of the pressure in the cold cathode gauge.

* * * * *